United States Patent [19]
Wagner

[11] Patent Number: 5,715,691
[45] Date of Patent: Feb. 10, 1998

[54] PORTABLE ICE MAKER

[76] Inventor: Anthony S. Wagner, 713 Mariner, Lakeway, Tex. 78734

[21] Appl. No.: 774,630

[22] Filed: Dec. 30, 1996

[51] Int. Cl.[6] .................................................. F25B 15/10
[52] U.S. Cl. ....................................... 62/110; 62/490
[58] Field of Search ......................... 62/101, 110, 490, 62/491, 492, 457.9

[56] References Cited

U.S. PATENT DOCUMENTS

| | | | |
|---|---|---|---|
| 2,743,588 | 5/1956 | Dreier | 62/492 |
| 3,137,147 | 6/1964 | Boren et al. | 62/490 |
| 4,151,727 | 5/1979 | Blomberg | 62/352 |
| 4,593,538 | 6/1986 | Borde et al. | 62/490 |

*Primary Examiner*—William Doerrler
*Attorney, Agent, or Firm*—Joseph F. Long

[57] ABSTRACT

A compact no moving part refrigeration unit powered with a flame driven generator is contained along with a propane cylinder and necessary controls in a cylindrical upright unit with an expanded base; the unit is sized to make four to eight pounds of ice in about a four hour period.

6 Claims, 3 Drawing Sheets

PORTABLE ICE MAKER

BACKGROUND OF THE INVENTION

Quite generally people who take prolonged fishing trips, hunters, campers and others need some readily available, portable, low cost means of making a supply of ice. This invention is aimed at filling this need.

In the invention ammonia, water and hydrogen is used as a refrigerant in a non moving part system to provide sufficient refrigeration to freeze about a four to ten pound cylindrical block of ice. The energy is supplied by a small hydrocarbon burner with propane being the preferable hydrocarbon The total piping for refrigeration, the hydrocarbon container, the burner, the feed tank, a liquid exchanger, an absorber, the generator, and the freezing container are included in one cylindrical double walled unit with an enlarged base to provide space and stability. Some of the necessary heat exchangers in the refrigeration piping are in compartments between the double wall and with large openings at the bottom of each compartment a chimney effect is created whereby the fast moving air greatly increases the transfer coefficient in the exchangers. Exchangers may be located in the double wall to take into account the force of gravity and change in temperature of the air as it proceeds upward in the chimney or double wall.

SUMMARY OF THE INVENTION

The invention encompasses a portable self contained unit designed to make four to ten pound blocks of ice. The unit is powered by a gas flame, preferably burning propane from a container stored within the unit. The refrigerant is about a thirty percent solution of ammonia in water with system pressured to about 325 pounds gauge with hydrogen The system may be described as follows:

a) the ammonia rich feed stream is separated into a weak ammonia-water stream that is cooled by preheating the inlet rich ammonia stream in a first exchanger before the rich ammonia stream enters a flame driven "perk" type generator that lifts a hot ammonia water stream into a first separator wherein the weak ammonia stream drains from the first separator and a stream that is essentially ammonia gas travels upward to a first stage condenser coil located in a chimney type compartment for air cooling and thence into a second stage condenser coil that is wrapped around a central core or ice bucket with a cone shaped bottom. The cone shaped bottom facilitates ice removal and provides more heat transfer surface for a cone shaped evaporator coil that fits very close to the exterior surface of the cone shaped bottom of the ice bucket. The second stage condenser liquifies any remaining ammonia gas. The liquid ammonia then passes through a very low pressure drop check valve and combines with a recycle hydrogen stream before entering the cone shaped evaporator. The hydrogen aids in the evaporation of the ammonia since the ammonia evaporation proceeds to the point where the partial pressure of ammonia plus the partial pressure of hydrogen equals the system pressure.

b) The ammonia-hydrogen stream drains to the bottom of an absorber where it is absorbed in the weak ammonia stream from the first exchanger. The absorber is run full of liquid and the effluent of hydrogen plus an ammonia rich stream flows through a cooler and separator. The separator separates the hydrogen which recycles back to the evaporator inlet and the cooled ammonia rich stream recycles back to the receiver-feed tank to complete a first of a continous cycle.

DETAILED DESCRIPTION OF THE INVENTION

The invention may described most easily from the drawings.

Figure 1:
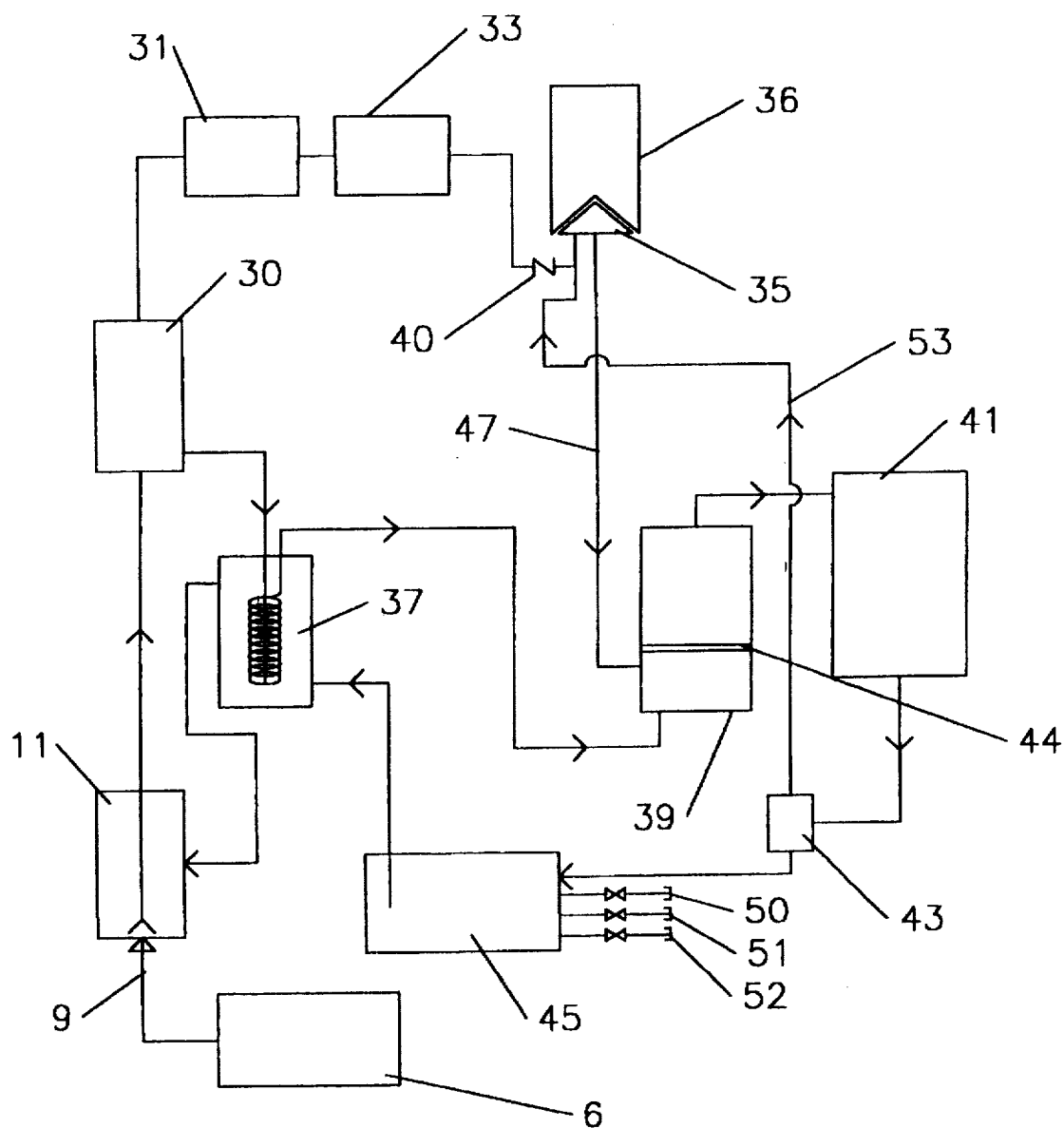
In FIG. 1 a flowsheet of the refrigeration of the unit is shown.

In FIG. 1 a flowsheet indicating equipment and process stream flows is shown. Receiver-feed tank 45, first exchanger 37, generator 11, and absorber 39 are charged with ammonia and water in a mole ratio of about one and one half moles of ammonia to four moles of water through lines 50 and 51. Hydrogen is added through line 52 to pressure the system to about 325 pounds per square inch gauge. The lines each have commercially available valves that will shut off to be leak proof and are also capped after charging as the system must be essentially leak proof to operate without undue maintenance. The ammonia is essentially soluble in the water and the insoluble hydrogen will before startup fill the rest of the system.

Fuel container 6 is portable and may contain anyone of several type hydrocarbons but for all around use propane is preferred. After burner 9 is ignited and the contents of the generator 11 heated, the heated ammonia-water stream percolates to the first separator 30 A weak ammonia-water stream drains from the separator 30 to be cooled by preheating the feed stream to generator 11 in exchanger 37. The cooled ammonia-water stream feeds to absorber 39.

The vapor stream from separator 30 flows through an air cooled exchanger 31, hereinafter called a first stage condenser. In the unit of this invention the preferred type cooler is a coil located in between double walls of the unit to allow heated air to rise to increase the transfer coefficient by increased airflow from the chimney effect. The temperature exit the first stage condenser 31 should be about 100 degrees Fahrenheit which is near or below the condensation point of the ammonia at the approximate 325 pounds gauge The secondary condenser 33 which in this unit is a coil type may be partially air cooled and cooled below the ammonia condensation temperature by being wrapped round the ice container 36 as shown clearly in FIG. 2. The cooled stream which is essentially liquid ammonia feeds through a low pressure drop check valve 40 such as a flapper typevalve.

Following the check valve a recycle hydrogen stream 53 mixes with the secondary condenser stream entering the cone shaped pancake type evaporator coil 35. This pancake type coil is shaped to fit closely to a cone shaped bottom of ice container 36. In a preferred embodiment this evaporator coil is covered smoothly on both sides with a commercially available heat transfer medium. The evaporator is heavily insulated on the side not in contact with the ice container 36 as shown in FIG. 2.

With the liquid ammonia-hydrogen stream mixture entering the evaporator the ammonia liquid will evaporate to form a hydrogen-ammonia vapor pressure to fulfill the normal gas laws.

Vaporized ammonia and the hydrogen stream drain through line 47 to mix with the weak ammonia stream from exchanger 37 at the bottom of absorber 39. In a preferred embodiment the absorber 39 has a porous ceramic plate 44 above the inlet streams. This plate causes intimate contact between the gaseous ammonia, hydrogen and water. The absorber is run essentially full and the overflow is run through a cooling coil 41 and into separator 43 which may be a cyclone separator to use minimum space. Cooled hydrogen recycles back through line 53 to the inlet of the evaporator 35 and the ammonia rich aqueous stream draining from the separator 43 recycles back to the receiver-feed tank 45.

Figure 2:
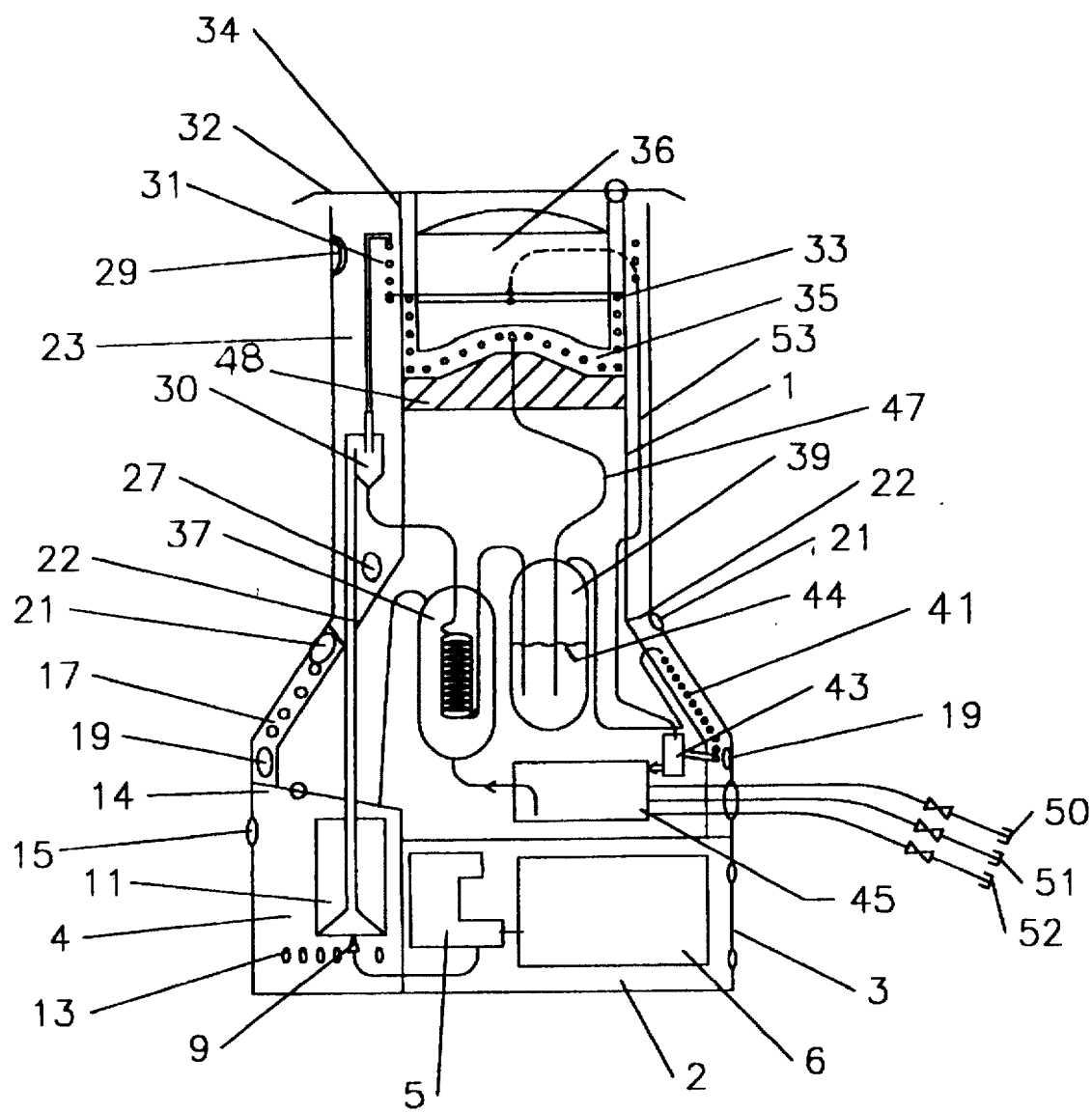
In FIG. 2 a cutaway view of the unit is shown.

In FIG. 2 a compact cylindrical body 1 has an expanded base section for stability of the unit and to provide space for the needed equipment. In a lower compartment 2 there is a hinged door 3 to allow removably inserting a propane cylinder 6 and commercially available controls 5 with a push start and controls to maintain a proper inlet pressure to the burner 9, to shut off the propane in the event of flame failure, and to shut off the propane if the unit tips over.

The high strength ammonia-water solution in receiver-feed tank 45 is preheated as it is pulled through the cooling side of exchanger 37 by action of the perk type generator 11. As the contents of generator 11 heats up liquid and gaseous ammonia perk upward into separator 30. Generator 11 is in a separate compartment 4 with air inlets 13 and hot air outlets 15 to carry off products of combustion. Separator 30 may be located in a chimney type air cooler 23 with cold air inlets 27 and hot air outlets 29 to cause most of the water to condense and to allow the ammonia vapor to travel into first stage condenser 31.

Liquid from separator 30 with some ammonia therein flows through cooling coils in exchanger 37 and thence into the bottom of absorber 39.

Figure 3:
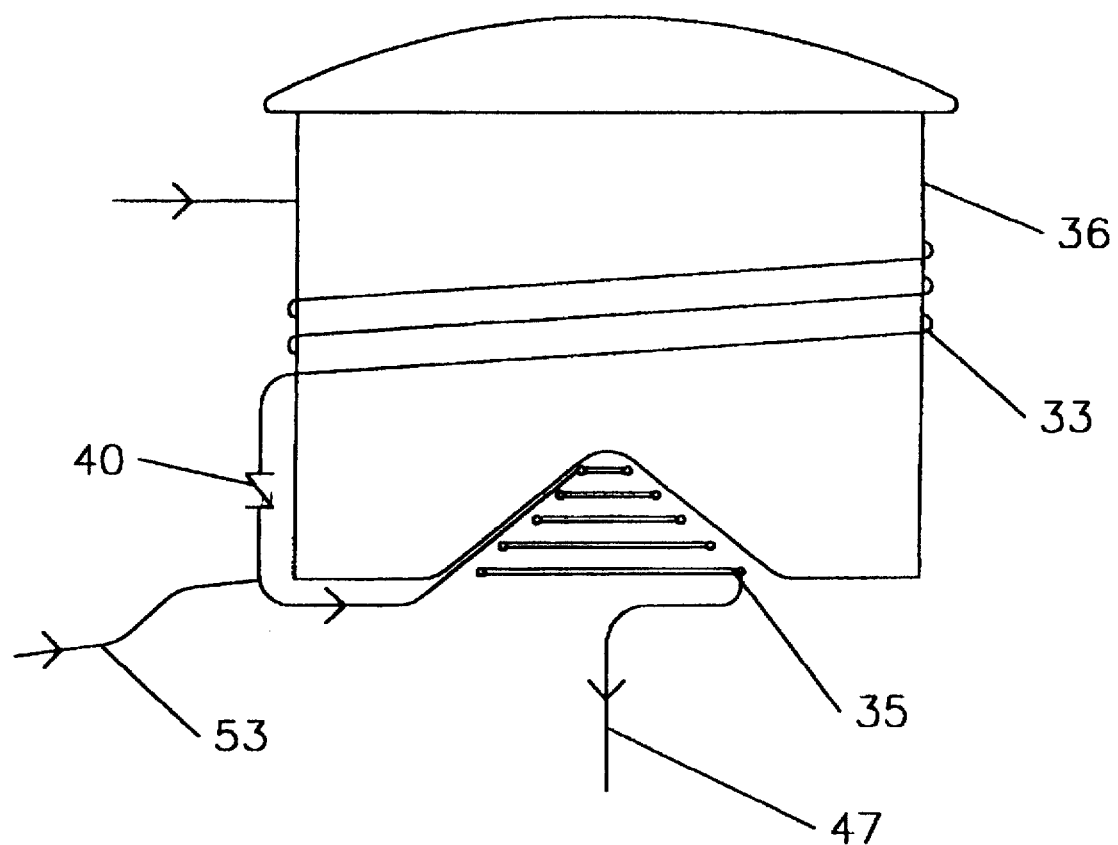
In FIG. 3 a detail of the interrelationship of the ice bucket V shaped bottom, second stage condenser 33, check valve 40, recycle hydrogen tie in 53 and evaporator coil 35 and outlet drain line 47 as outlined in FIG. 2 is shown.

Off gas from the separator 30 which is mainly ammonia vapor flows through cooling coils in the first stage condenser 31. These cooling coils are located in the same chimney type air cooler 23 as the separator 30. The stream exit the first stage condenser 31 flows into a second stage condenser 33. The second stage condenser 33 is wrapped to fit closely but removably around the central core or ice container 36. The ice container 36 is covered with a hinged lid 32. The coils in condenser 33 are preferably encased in a heat transfer medium to facilitate heat transfer and condense the ammonia to a liquid form. The ammonia liquid flows through a low pressure drop check valve 40 shown in FIG. 3 and joins a recycle hydrogen stream 53 as the stream enters an evaporator 35 which is a set of coils wound in a cone shape to fit closely against a cone shaped bottom of the ice bucket 36 as shown in FIG. 3. This exchanger coil is also covered with a heat transfer medium and is insulated with insulation 48 on the side away from the ice bucket 36.

The vaporized ammonia and the hydrogen flow downward through line 47 to enter the absorber 39 below a perforated ceramic plate 44 in the absorber 39. The ceramic plate breaks the gaseous ammonia and hydrogen into very fine bubbles causing maximum scrubbing of the hydrogen in the liquid and excellent absorption of the ammonia. The scrubber or absorber 39 overflows into outlet cooling coils 41 and thence into separator 43. The cooled hydrogen recycles back through line 53 to the evaporator coils 35. The aqueous ammonia rich stream drains from separator 43 to the receiver-feed tank 45 thus completing the continous cycle in the unit.

In FIG. 3 the conical bottom ice container 36 with the second stage condenser cooling coil 33 wrapped around the ice bucket and leading through a check valve 40 to combine with a recycle hydrogen stream from line 53 at an inlet to the cone shaped evaporator coil 35. The exit gaseous ammonia and hydrogen stream flow through line 47 to the ammonia absorber as shown in FIG. 2.

What is claimed is:

1. A method for making blocks of ice in a portable, non moving part refrigeration unit comprising:

a) opening a hinged lid in said unit and filling an open topped, straight walled container with potable water;

b) charging a receiver-feed tank and an associated exchanger and absorber and perk type generator with hydrogen, ammonia, and water in a ratio of one and one half moles of ammonia and four moles of water with sufficient quantity of hydrogen to pressure said system to about 325 pounds gauge with said ammonia-water mixture filling said receiver-feed tank, said generator, said exchanger, and said absorber with said liquid at said overall system pressure of about 325 pounds per square inch gauge;

c) activating a control network in a lower compartment of said unit to feed and ignite an hydrocarbon-air mixture in a burner under said generator; said generator acting to lift an ammonia rich aqueous stream into a separator; said separator acting to separate a weak aqueous ammonia stream that flows through an exchanger to said ammonia absorber; a primarily ammonia vapor stream from said separator flows through an air cooled first stage condenser and through a second stage condenser to condense said ammonia to a liquid form, said liquid ammonia stream combines with a recycle hydrogen stream and feeds into an evaporator and sufficient ammonia vaporizes to establish equilibrium in the evaporator thereby freezing said water into ice; ammonia vapor from said evaporator is scrubbed with said weak aqueous ammonia stream in said ammonia absorber; effluent from said absorber is cooled and separated into a hydrogen stream that forms said recycle hydrogen stream feeding said evaporator and an aqueous ammonia rich stream that recycles back to said receiver-feed tank.

2. A portable refrigeration unit comprising:

a) a double walled cylindrical unit with an enlarged base means, b) a hydrocarbon in a portable container removably held in a first compartment in said base means, c) a burner in a vented second compartment of said base means operably connected with said portable container, d) a perk type generator means in said second compartment with said generator operably connected with said burner;

e) a push button start means and a means to shut off said burner if said unit tips over after said burner is activated mounted in said first compartment;

f) a feed tank-receiver mounted in said unit above said first compartment;

g) a refrigerant means charged into said feed tank-receiver at about 325 pounds per square inch pressure, said refrigerant means comprising ammonia, water and hydrogen;

h) a first exchanger means to receive inlet cooling fluid from a bottom draw off from said feed tank-receiver and with said fluid feed exiting into said generator;

i) a first separator means at a higher level than said first exchanger to receive water-ammonia liquid and ammonia vapor mixture from said generator and allow said separated water-ammonia liquid to be cooled flowing through said first exchanger;

j) a first stage condenser means located in a chimney type compartment to cool said ammonia vapor from said first separator;

k) a cylindrical freezer compartment means integrally attached in a top portion of said unit;

l) a removable central container with an inverted cone shaped bottom with said central container sized to hold a minimum of four pounds of ice in a lower three inches of said container;

m) a second stage condenser which is a coil type condenser sized and located to fit closely and removably around said central container to receive fluid flow from said first stage condenser;

n) a check valve means exit said second stage coil type condenser to prevent backflow into said second stage condenser;

o) a conical pancake type evaporator means sized to fit against a bottom of said central container and connected at an inlet end to said check valve;

p) a connection for an inlet hydrogen stream at a point in said evaporator a minimum of about two inches from an exit of said check valve;

q) an absorber means mounted below said evaporator to receive and scrub ammonia from an exit flow that is essentially hydrogen and ammonia from said evaporator using an exit stream from said first exchanger that is essentially a weak ammonia-water stream.

r) absorber outlet exchanger coils located in a chimney type air cooler to receive an outlet ammonia-water-hydrogen fluid stream from said absorber;

s) a second separator means to receive said fluid stream from said absorber outlet exchanger coils and to separate said fluid stream into a water-ammonia rich stream that recycles back to said receiver-feed tank and a hydrogen rich stream that recycles back to said inlet to said pancake type evaporator.

3. A portable refrigeration unit as in claim 2 wherein said refrigerant means comprises ammonia, water and hydrogen in a mole ratio of about four moles of water, one and one half moles of ammonia, and sufficient hydrogen to pressure the system to about 325 pounds gauge.

4. A portable refrigeration unit as in claim 2 wherein said conical pancake coil evaporator is covered with a heat transfer medium.

5. A portable refrigeration unit as in claim 2 wherein said ice container is manufactured with a non stick interior.

6. A portable refrigeration unit as in claim 2 wherein said weak ammonia stream and said hydrogen-ammonia stream enter below a porous ceramic plate in said absorber means.

* * * * *